US006691755B2

United States Patent
Armellin et al.

(10) Patent No.: US 6,691,755 B2
(45) Date of Patent: Feb. 17, 2004

(54) HIGH TRANSVERSE-CURVATURE TIRE FOR TWO-WHEELED VEHICLES INCLUDING SPECIFIED BELT STRUCTURE

(75) Inventors: Giancarlo Armellin, Nova Milanese (IT); Peter Kronthaler, München (DE); Thomas Zoller, München (DE)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/162,746

(22) Filed: Jun. 6, 2002

(65) Prior Publication Data

US 2002/0195184 A1 Dec. 26, 2002

Related U.S. Application Data

(62) Division of application No. 09/217,912, filed on Dec. 22, 1998, now Pat. No. 6,412,533.
(60) Provisional application No. 60/074,023, filed on Feb. 9, 1998.

(30) Foreign Application Priority Data

Dec. 29, 1997 (EP) .............................. 97830723

(51) Int. Cl.[7] .............................. B60C 1/00; B60C 9/06; B60C 9/12; B60C 9/18; B60C 9/22
(52) U.S. Cl. ....................... 152/458; 531/532; 531/549; 531/555; 531/557
(58) Field of Search ................................ 152/531, 533, 152/557, 549, 555, 532, 458, 527, 556

(56) References Cited

U.S. PATENT DOCUMENTS

| 3,067,795 | A | 12/1962 | Neuville et al. |
| 4,284,116 | A | 8/1981 | Sato et al. |
| 4,869,307 | A | 9/1989 | Bormann et al. |
| 5,178,703 | A | 1/1993 | Onoda et al. |
| 5,562,792 | A | 10/1996 | Caretta |
| 5,645,662 | A | 7/1997 | Terada |
| 6,397,911 | B1 | 6/2002 | Armellin et al. |

FOREIGN PATENT DOCUMENTS

| DE | 39 11 031 A1 | 10/1989 |
| EP | 0329589 A2 | 8/1989 |
| EP | 0635383 | 1/1995 |
| EP | 0703102 A2 | 3/1996 |
| EP | 0718122 A1 | 6/1996 |
| EP | 0756949 A1 | 2/1997 |
| EP | 0808730 A1 | 11/1997 |
| GB | 2283215 A | 5/1995 |
| JP | 1-254 404 A | 10/1989 |

OTHER PUBLICATIONS

S. Kazuhide, "Radial Tire for Two–Wheeled Vehicle," Patent Abstracts of Japan, vol. 098, No. 003, JP 09–286,204, Bridgestone Corp. (Nov. 4, 1997).
U.S. patent application Ser. No. 09/218,362; filed Dec. 22, 1998; inventors Giancarlo Armellin et al.; entitled "High Transverse–Curvature Tire for Two–Wheeled Vehicles and Method for Its Manufacture."
U.S. patent application Ser. No. 10/119,842, Armellin et al., filed Nov. 4, 2002.

*Primary Examiner*—Adrienne C. Johnstone
(74) *Attorney, Agent, or Firm*—Finnegan, Henderson, Farabow, Garrett & Dunner, L.L.P.

(57) ABSTRACT

A high transverse-curvature tire for two-wheeled vehicles includes a carcass structure, a belt structure, and tread. The carcass structure includes at least two superimposed plies provided with reinforcing cords. The belt structure includes radially-outer and radially-inner layers. Each ply's reinforcing cords are essentially parallel to other reinforcing cords of that ply and are oriented along directions inclined with respect to an equatorial plane of the tire. The reinforcing cords of at least two adjacent plies are oriented in opposite directions with respect to the equatorial plane. The carcass structure includes at least one first sheet, located between the at least two plies, made of an elastomeric material incorporating fibrous reinforcing fillers. The plurality of circumferential coils are distributed with a constant density throughout an axial development of the belt structure. The radially-inner layer includes at least one second sheet made of an elastomeric material incorporating fibrous reinforcing fillers.

11 Claims, 3 Drawing Sheets

HIGH TRANSVERSE-CURVATURE TIRE FOR TWO-WHEELED VEHICLES INCLUDING SPECIFIED BELT STRUCTURE

CROSS-REFERENCE TO RELATED APPLICATIONS

This application is a divisional of U.S. patent application Ser. No. 09/217,912, filed Dec. 2, 1998, in the U.S. Patent and Trademark Office, which issued as U.S. Pat. No. 6,412,533, on Jul. 2, 2002, the contents of which are relied upon and incorporated herein by reference, and which claims the benefit under 35 U.S.C. §119(e) of U.S. Provisional Application Serial No. 60/074,023, filed Feb. 9, 1998, in the U.S. Patent and Trademark Office.

DESCRIPTION

1. Background of the Invention

In its more general aspect, the present invention relates to a high transverse-curvature tire for two-wheeled vehicles.

More particularly, the invention relates to a tire preferably, though not exclusively, usable in the so-called high-performance "touring" motor-bikes having a high weight.

2. Known Art

In the field of production of tires for two-wheeled vehicles, and in particular, those intended for equipping the so-called "touring" motor-bikes generally having a swept volume exceeding 1000 cm$^3$, a high weight and a high torque, the need is increasingly felt of providing ever higher performances in terms of road behavior both in straight stretch and in curve, stability of the vehicle at high speed, kilometric yield, wear uniformity and regularity, and low weight.

In order to satisfy this need, tires for two-wheeled vehicles have been manufactured for a long time with a carcass structure comprising a couple of plies made of rubberized fabric reinforced with cords symmetrically inclined with respect to the equatorial plane of the tire—usually known as cross-plies carcass—and possibly an intermediate structure (breaker), also realized with couples of strips made of rubberized fabric provided with cords arranged at an angle with respect to the equatorial plane of the tire.

Even though this tire structure could ensure an extremely regular curve behavior of the motor-bike, the use of this type of tires involved problems of comfort, stability of the vehicle at high speed, and especially of irregular wear of the tread, often associated to a removal of bulk portions of rubber, according to a phenomenon known in the art by the term of: "chunking".

To try to prevent these drawbacks, it was then suggested to use a tire comprising a carcass structure of the so-called "radial" type, i.e. a tire provided with reinforcing cords essentially perpendicular to the equatorial plane of the tire, on which structure a belt structure comprising at least one couple of strips made of rubberized fabric provided with cords placed at an angle with respect to the equatorial plane of the tire or, alternatively, a cord winding, preferably made of metal, oriented in a circumferential direction and known in the art by the term of: zero-degree cords, is coaxially associated.

Even though the tires provided with a radial carcass have improved the situation in terms of comfort and vehicle straight-away stability at high speed with a substantial elimination of chunking phenomena—to such an extent that they are considered top range products by those skilled in the art—they are not suitable for use in the so-called "touring" motor-bikes having a high-weight and a high performance.

Actually, the motor-cycles of this type equipped with a tire having a radial carcass are particularly subject to an undesired "floatation" effect while running along a curve, also known by the term of "pudding effect", which causes the motor-bike to undergo a swaying phenomenon that would not be easily damped and that, in some instances, may be even self-amplifying. In extreme conditions, this phenomenon may even lead drivers to lose control of the vehicle, with obviously deleterious consequences.

SUMMARY OF THE INVENTION

According to the present invention, the Applicant has now understood that the problem of achieving adequate performances in terms of road behavior, both in straight stretches and along curves, stability of the vehicle at high speeds, kilometric yield, wear regularity, and low weight can be solved by combining a carcass structure having at least one ply provided with reinforcing cords inclined with respect to the equatorial plane of the tire, with a belt structure including a radially outer layer comprising a plurality of zero-degree cords and a radially inner layer comprising at least one sheet made of an elastomeric material.

In other words, the Applicant has become aware of the fact that the aforesaid problem can be effectively solved by renouncing to use the radial carcass, i.e., the very structure that is unanimously considered by those skilled in the art as the "top" of the available technology, provided that the carcass equipped with reinforcing inclined cords is adequately separated from the belt layer comprising the zero-degree cords, by interposing a sheet made of an elastomeric material.

Hence, the present invention provides a tire comprising:
a) a carcass structure including at least one ply provided with reinforcing cords essentially parallel to one another and oriented along directions inclined with respect to the equatorial plane of the tire;
b) a belt structure coaxially extending around the carcass structure, including:
  i) a radially inner layer comprising at least one sheet made of an elastomeric material;
  ii) a radially outer layer including a plurality of circumferential coils, axially arranged side by side, of at least one inextensible cord, circumferentially wound at a substantially null angle with respect to the equatorial plane of the tire;
c) a tread, coaxially extending around the belt structure.

According to the invention, the Applicant has in particular and unexpectedly found that by interposing a sheet made of an elastomeric material between the carcass structure and the radially outer layer provided with zero-degree cords of the belt structure, it is possible to achieve at the same time both the desired features of road holding and curve stability imparted to the tire by the carcass structure, and the desired features of comfort, wear regularity and uniformity and stability of the vehicle at high speeds in straight stretches, imparted to the tire by the zero-degree cord layer of the belt structure.

More particularly, the Applicant has unexpectedly found that said sheet made of an elastomeric material allows the carcass structure and the zero-degree cords of the belt structure to exercise the aforesaid effects substantially independently from one another, preventing at the same time the zero-degree cords from damaging the reinforcing cords of the underlying carcass structure.

Thanks to the structural features of the carcass structure, the tire of the invention is able to develop high camber thrusts quite sufficient to balance the centrifugal thrust affecting the motor-bike, with a very homogeneous curve behavior.

According to the invention, it has also been found that camber and drift thrusts developed by the tire are increased by the combination of one or more carcass plies provided with reinforcing cords crown-forming a suitable angle with respect to the equatorial plane of the tire, with the radially outer layer incorporating the zero-degree cords of the belt.

Thanks to this feature, it was observed that a motor-bike equipped with a couple of tires having such a structure shows advantageous features of neutral driving, so that the driver can travel the curvilinear trajectory by simply inclining the vehicle and without correcting its trim, in particular the steering angle of the handlebar.

Besides, it was found that the cross-plies carcass lends the tire advantageous features of transverse strength and curve stability, while the aforesaid belt structure lends the tire dimensional stability, directional stability and lower energy absorption, achieving at the same time a low rolling resistance and a substantial disappearance of the chunking phenomenon.

In particular, it was observed that the presence in the belt structure of a radially outer layer provided with zero-degree cords allows to increase both the directional stability and the tire ground-contacting area, i.e. the area of contact with the ground, in all of the operating conditions of the tire.

Thanks to this feature, both the stresses due to scraping on the road and the stresses due to hysteresis dissipation in the rubber composition of the tread are reduced, with a substantial reduction in tire overheating due to the centrifugal force which develops during running, counter-balanced by the substantial inextensibility of the radially outer layer provided with zero-degree cords of the belt structure.

The adoption of such a combination of carcass and belt structures contributes to reduce the weight of the tire, with all of the ensuing advantages in terms of inertia due to the nonsuspended masses.

Preferably, the reinforcing cords incorporated in the ply (plies) of the carcass structure are essentially constituted by high modulus fibers of a material selected from the group comprising: rayon, nylon, polyethylene naphthalene 2,6 dicarboxylate (PEN) and polyethylene terephthalate (PET).

Preferably, the reinforcing cords incorporated in the ply (plies) of the carcass structure form a crown angle—measured at the equatorial plane of the tire—comprised between 25° and 70° with respect to the equatorial plane of the tire.

In this way an optimum curve behavior of the tire was observed, with the development of an adequate camber-thrust.

According to a particularly preferred embodiment of the invention, the carcass structure of the tire comprises at least one couple of superposed plies, each provided with reinforcing cords parallel to one another and oriented according to a direction inclined and opposite, preferably symmetrically, with respect to the equatorial plane of the tire with respect to the cords of the adjacent ply.

Preferably, the reinforcing cords incorporated in the carcass ply(plies) are made of a material different from the material of the reinforcing cords of the radially adjacent ply.

In such case, it is preferable to select materials having a modulus that increases as one radially proceeds toward the outside; in so doing, a further advantageous increase was observed in the effect of containing the thrusts due to the centrifugal force carried out by the belt structure.

Preferably, as the crown angle formed by the reinforcing cords of the carcass plies decreases, it may be convenient to insert between the latter at least one sheet made of an elastomeric material, possibly incorporating binding means suitable to increase its stretcheability properties without substantially altering the adhesion properties of the elastomeric material in the green state.

In this way, it is possible to absorb the tearing stresses that are generated between the carcass plies during rolling of the tire.

Preferably, the aforesaid binding means comprise the so-called aramid pulp (short fibrillated fibers of poly-paraphenylene-terephtalamide), of the type commercially known as "Kevlar®-pulp" or "Twaron®-pulp" (Kevlar and Twaron are registered trademarks of DuPont and Akzo, respectively).

Preferably, said short fibrillated fibers are incorporated in the elastomeric material that makes up said sheet, in an amount comprised between 1 and 10 parts by weight per each 100 parts by weight of rubber (phr), and have a length comprised between 0.1 mm and 2.5 mm.

Advantageously, said sheet made of an elastomeric material has a thickness comprised between 0.075 mm and 0.5 mm.

According to the invention, the belt structure coaxially extending around the carcass structure comprises a radially inner layer including at least one sheet made of an elastomeric material.

As illustrated hereinabove, such sheet acts as an element suitable to separate, from both the structural and the functional viewpoints, the carcass structure from the layer including the zero-degree cords of the belt structure, preventing, among other things, the latter from damaging the reinforcing cords of the underlying carcass structure possibly causing a fatigue break of the same.

In order to optimize such separation action, the aforesaid sheet made of an elastomeric material has a thickness comprised between 0.5 mm and 3 mm and, still more preferably, between 1 mm and 3 mm.

Preferably, furthermore, such sheet made of an elastomeric material incorporates appropriate binding means suitable to increase its stretcheability properties without substantially altering the adhesion properties of the elastomeric material in the green state.

Preferably, the aforesaid binding means comprise the so-called aramid pulp (short fibrillated fibers of poly-paraphenylene-terephtalamide), of the type commercially known as "Kevlar®-pulp" or "Twaron®-pulp" (Kevlar and Twaron are registered trademarks of DuPont and Akzo, respectively).

Preferably, said short fibrillated fibers are incorporated in the elastomeric material that makes up said sheet, in an amount comprised between 1 phr and 10 phr, and have a length comprised between 0.1 mm and 2.5 mm.

Preferably, said short fibrillated fibers are preoriented, for instance by means of a calendering operation, according to the main direction of the forces which the supporting element is subject to during the tire manufacturing process. Such direction is usually the circumferential direction of the tire and said preorientation operation is preferably carried out by calendering said sheet during its manufacture.

The elastomeric material reinforced with said aramid pulp has, at the green state, a tensile stress at break comprised between 3 MPa and 7 MPa, with a 50% elongation at a tensile stress comprised between 0.6 MPa and 3 MPa, while the same elastomeric material without aramid pulp has, at the green state, a tensile stress at break comprised between 1 MPa and 2 MPa, with a 50% elongation at tensile stress comprised between 0.2 MPa and 0.5 MPa.

Preferably, the material that constitutes the sheet of the radially inner layer of the belt structure is a natural rubber-based composition containing carbon-black in an amount comprised between 30 phr and 70 phr, filled with the usual ingredients known in the art (plasticizers, protecting agents, antidegradation agents, vulcanizers), so as to obtain an elastomeric matrix as similar as possible to that of the elements to which said sheet has to adhere.

As illustrated hereinabove, the radially outer layer of the belt structure comprises a plurality of circumferential coils, axially arranged side by side, of at least one inextensible cord, wound at a substantially null angle with respect to the equatorial plane of the tire, and usually known in the art by the term of zero-degree cords.

Preferably, the zero-degree cord or cords of the radially outer layer of the belt structure are high-elongation metal cords with high carbon content steel wires.

Alternatively, the zero-degree cords may be textile cords made of aramid.

When a tire to be mounted on the rear wheel of a motor-bike is to be manufactured, the cord coils arranged at a substantially null angle with respect to the equatorial plane of the tire are preferably distributed with a constant density throughout the axial development of the belt structure.

Instead, when a tire to be mounted on the front wheel of a motor-bike is to be manufactured, the ford coils arranged at a substantially null angle with respect to the equatorial plane of the tire are preferably distributed with a variable density throughout the axial development of the belt structure.

According lo this last embodiment of the invention, the distribution density of the cord coils progressively changes along the layer, from the equatorial plane toward the ends, preferably according to a prefixed relation, having a value not higher than 15 cords/cm in an area placed on either side of the equatorial plane of the tire.

In this way, it is advantageously possible to obtain a belt structure which is at the same time flexible in the middle, to absorb and damp the vibrations due to the ground roughness, and rigid along the sides, to develop high slip thrusts.

According to the experiments carried out by the Applicant, such relation may conveniently have the following expression:

$$Nx = K \frac{R^2}{r^2} No$$

wherein:

No is the number of cord coils arranged in a central portion of unitary length located on either side of the equatorial plane of the belt structure;

R is the distance between the center of said portion and the rotation axis of the tire;

r is the distance between the center of the generic unitary portion comprised between the equatorial plane and the ends of said radially outer layer of the belt structure and the rotation axis of the tire;

K is a parameter that takes into account the constituent material and the formation of cords, as well as the amount of rubber around the cord, and the weight of a portion of the radially inner layer of the belt structure at said unitary portion, which is variable with variations in the material type and in the structural features of the radially inner layer of the belt structure along the crown profile that diverge from the reference values.

This parameter K may have a value of substantially close to 1 if all the cords have the same formation and all the connected materials are the same throughout the layers, or different values according to the variations in the materials and formation of the reinforcing elements along the peripheral development of the belt structure.

A distribution of the cords in accordance with such relation ensures both uniformity of the stress acting on the belt structure during use of the tire as a consequence of the centrifugal force applied, and the necessary differentiated stiffness along the axial direction.

Obviously, those skilled in the art may find other relations which, depending on the aforesaid design variables, would allow to obtain at the same time a differentiated stiffness along the axial direction and a stress uniformity in the belt structure of the running tire, by varying in a controlled and predetermined manner the density of the aforesaid cords.

As to the density of the zero-degree cords in the portion located on either side of the equatorial plane, where the maximum thinning out take place, this density, for a tire to be mounted on the front wheel, is preferably not greater than 8 cords/cm and more preferably comprised between 3 cords/cm and 6 cords/cm.

For a tire to be mounted on the front wheel, the width of said portion varies preferably from 10% to 30% of the axial development of the belt.

Conveniently, for a tire to be mounted on the front wheel, the quantity of cords in said central portion is equal to a value comprised between 60% and 80% of the cords quantity near the shoulders of the tire, where the density of said cords is preferably not greater than 10 cords/cm and more preferably included between 6 cords/cm and 8 cords/cm.

BRIEF DESCRIPTION OF THE DRAWINGS

Additional features and advantages will be more readily apparent by the following description of a preferred embodiment of a tire according to the invention, solely provided by way of non limitative indication, reference being made to the attached drawings.

In such drawings.

DETAILED DESCRIPTION OF PREFERRED EMBODIMENTS

Figure 1:
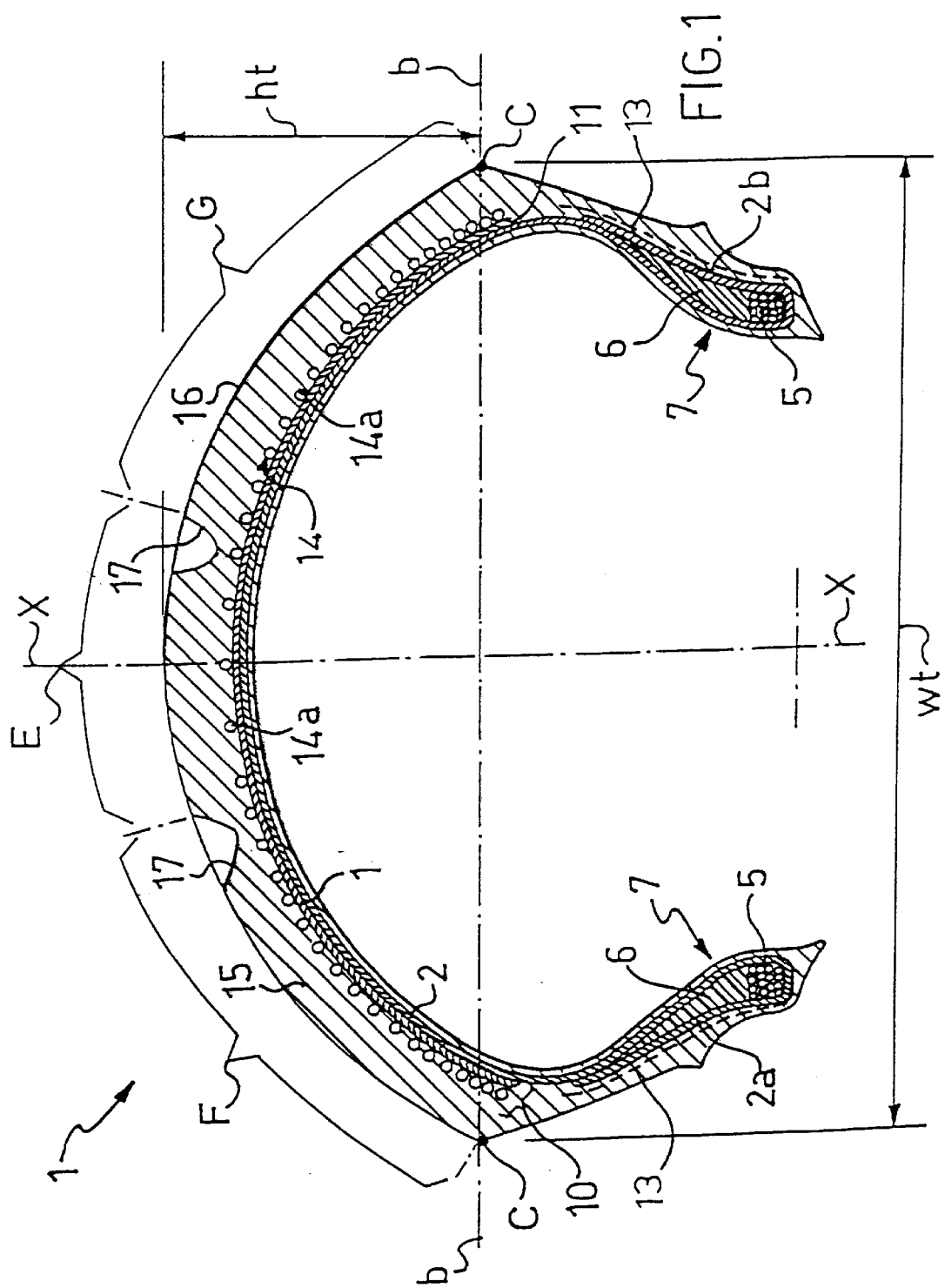
FIG. 1 shows a cross-section view of a tire according to the invention.

In FIG. 1, 1 indicates a high-transverse-curvature tire intended for two-wheeled vehicles, in particular a tire to be mounted on a high-performance motor-bike of the so-called "touring" type.

As is known, the extent of the tire transverse curvature is defined by the specific value of the ratio, generally known by the term of camber, between the distance ht (measured along the equatorial plane X—X) of the tread crown from the line b—b passing through the ends C of the tread and the distance wt measured along the tire chord, between said ends.

If the tread ends cannot be easily identified, for instance due to the lack of a precise reference such as for instance the edge indicated by C in FIG. 1, the value of the tire maximum chord may be assumed as the distance wt.

Tire 1 comprises a carcass structure 2, including at least one carcass ply whose opposite side edges 2a, 2b are turned around respective bead cores 5.

On the external peripheral edge of bead cores 5, an elastomeric filling 6 is applied which fills the space defined between the carcass structure 2 and the corresponding turned side edges 2a, 2b of the same.

As is known, the tire area comprising bead cores 5 and filling 6 forms the so-called bead, globally indicated by 7, intended for anchoring the tire 1 onto a corresponding mounting rim, not shown.

Figure 2:
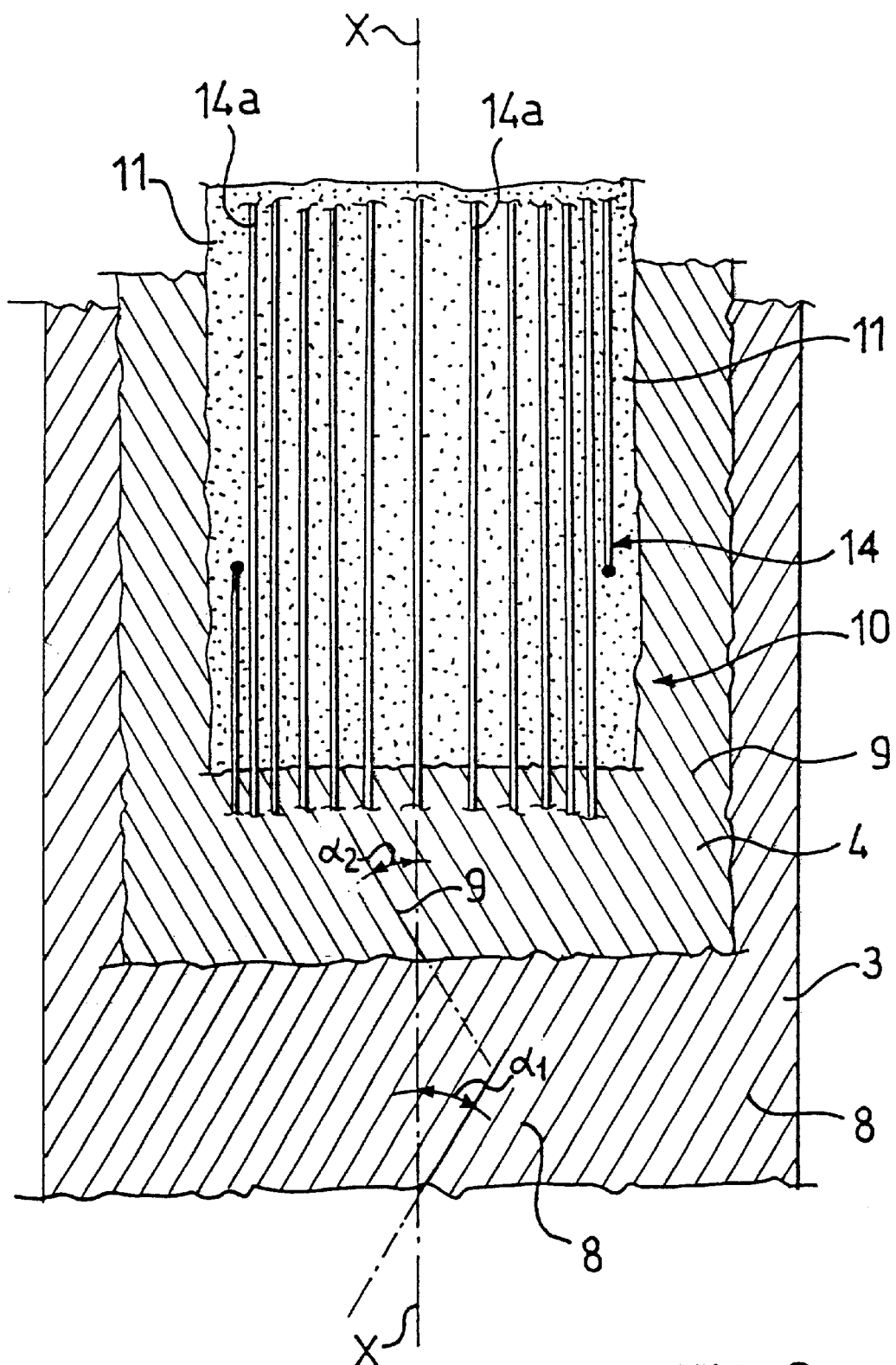
FIG. 2 shows a plan view, schematic and simplified, of some portions of the carcass and belt structures of the tire of FIG. 1.

According to a preferred embodiment, the carcass structure 2 comprises a couple of radially inner and radially outer carcass plies 3, 4, essentially constituted by a sheet of an elastomeric material known per se, for instance made of a natural rubber-based material, incorporating a plurality of reinforcing cords 8, 9 (FIG. 2).

Advantageously, said reinforcing cords are essentially parallel to one another and oriented according to inclined directions in each ply and opposed with respect to the cords of the adjacent ply with respect to the equatorial plane X—X of the tire 1.

The reinforcing cords 8 of the radially inner carcass ply 3 are constituted by textile fibers of nylon, rayon or PEN and form an angle $\alpha_1$ of about 50° with respect to the equatorial plane X—X of the tire 1.

The reinforcing cords 9 of the radially outer carcass ply 4 are constituted by rayon textile fibers and are inclined in an opposite direction with respect to the cords 8 of the radially inner ply 3, forming angle $\alpha_2$ of about 50° with respect to the equatorial plane X—X of the tire 1.

According to a preferred embodiment, the carcass structure 2 also comprises a strip 13 made of a reinforcing textile material in an axially outer position with respect to the turned side edges 2a, 2b of the same.

More particularly, the strip 13 is radially extending from a radially inner edge of bead core 5 up to at least the free end of the turned side edges 2a, 2b and preferably slightly beyond the same, and includes reinforcing cords made of metal or textile material, such as for instance nylon, rayon or aramid.

Preferably, such reinforcing cords are essentially parallel to one another and are oriented according to inclined directions, preferably in an opposite direction with respect to the reinforcing cords 9 of the radially outer ply 4 of the side turned edges 2a, 2b adjacent to the strip 13, which reinforcing cords form an angle comprised between 20° and 50° with respect to the radial direction of the tire 1.

A belt structure 10, which comprises a radially inner layer and a radially outer layer, both comprising reinforcing elements of the structure, is coaxially associated to said carcass structure 2.

More particularly, the radially inner layer of the belt structure 10 comprises a sheet 11 made of an elastomeric material, preferably incorporating homogeneously dispersed fibrous reinforcing fillers made of a material selected from the group comprising textile and metal fibers, fiberglass or short fibrillated aramid fibers.

Conveniently, the sheet 11 incorporates as a reinforcing fibrous filler the so-called aramid pulp (short fibrillated fibers of poly-paraphenylene-terephtalamide), of the type commercially known as "Kevlar®-pulp" or "Twaron®-pulp" (Kevlar and Twaron are registered trademarks of DuPont and Akzo, respectively), or equivalent binding means, suitable to increase the properties of mechanical strength and stretcheability of the elastomeric material in the green state, without substantially altering the adhesion properties thereof.

In fact, it s found that in the presence of the aramid fibers dispersed in the composition of the elastomeric material which makes it up, the sheet 11 may take the form of an extremely thin sheet, for instance of a thickness of 0.5 mm to 3 mm, without undergoing any laceration as a consequence of the permanent sets caused in the same during the manufacturing steps of the tire.

More particularly, it was found that the best results are those obtained by incorporating the aramid pulp in the composition of the green elastomer in an amount comprised between 1 phr and 10 phr (parts by weight per 100 parts of rubber), and using fibers having a length comprised between 0.1 mm and 2.5 mm.

The resistance to the mechanical stresses imparted to the sheet 11 during the manufacturing steps of the tire 1 may also be further increased by shaping such sheet through calendering, so that the aramid fibers are preoriented according to a preferred direction. Such preferred direction, at least for the type of use of the described tire, is usually the circumferential direction of the tire, coinciding with the longitudinal direction of the sheet coming out of the calendering machine.

The radially outer layer of the belt structure 10 comprises a plurality of circumferential coils 14a, axially arranged side by side, of a cord 14 or a tape of few cords (preferably 2 to 5), circumferentially inextensible, spirally wound from one end to the other of the carcass structure 10.

It is here specified that the following description will always refer to cords, which term is intended to indicate also the individual elementary wires or the untwisted yarns, whenever the text will allow.

Besides, it also pointed out that a constant winding pitch along the peripheral development of the belt structure 10 gives rise in any case, due to the curvature of the carcass structure 2, to a variable density along the axial direction.

According to the aforesaid arrangement, the cords 14 form a plurality of circumferential coils 14a, substantially oriented according to the rolling direction of the tire, usually called "zero-degree" arrangement with reference to its position with respect to the equatorial plane X—X of the tire 1.

Preferably, the cord coils 14a are wound on the sheet 11 according to a prefixed relation, which is constant in the case of a rear tire and variable in the case of a front tire.

In the latter case the density of the cord coils 14a increases from the center toward the ends of the belt structure 10, as will appear more clearly hereinbelow.

Even though the coiling by itself and the pitch variability involve a winding angle different from zero, this angle remains so small that it may be substantially considered as always equal to zero degrees.

In a advantageous embodiment, the aforesaid cords 14 are the well known high elongation (HE) metallic cords, the use and the features of which have already been widely described, for instance in European Patent no. 0 461 464 of the same Applicant.

More in detail, such cords are constituted by a given number of strands, 1 to 5, preferably 3 to 4, each strand being constituted by a given number of individual wires, 2 to 14, preferably 4 to 10, having a diameter greater than 0.10 mm, preferably comprised between 0.12 mm and 0.35 mm. The wires in the strands and the strands in the cord are helically wound together in the same direction, with winding pitches equal or also different for the wires and the strands.

Preferably, the cords 14 are made of high carbon (HT) content steel wires, i.e. steel wires with a carbon content higher than 0.9%. In particular, in a specific prototype prepared by the Applicant, the helical winding of the radially outer layer of the belt structure 10 was constituted by a single cord 14, known as 3×4×0, 20 HE HT, spiralled from one end of the belt structure to the other: the above description defines a metal cord formed of three strands each consisting of four elementary wires wound in the same direction as the strands and having a diameter of 0.20 mm; as is known, the abbreviation HE means "high elongation" and the abbreviation HT means "high tensile" steel.

Such cords have an ultimate elongation comprised between 4% and 8%, and a typical behavior to tensile stress, the well known and so called "spring behavior".

Because of this behavior—desired, on the other hand—it is possible to advantageously control the pre-loading condition of the zero-degree winding in the green tire, before the vulcanization.

This may be conveniently carried out for instance by winding the cord(s) while imparting some stress around the radially inner layer of the belt structure 10 previously arranged on the assembly drum.

Clearly, the preferred use of metal cords does not exclude, for the purposes of the invention, the use of other cords, in particular the likewise known textile cords made of aramid fiber, commercially known as Kevlar®, a registered trademark of DuPont.

As said hereinabove, when a tire adapted to be mounted on the front wheel of a motor-bike is to be manufactured, the distribution density of the cord coils 14a preferably progressively varies along the outer layer of the belt structure 10, from the equatorial plane X—X of the tire 1 toward the opposite shoulder portions F, G of the same, preferably according to a prefixed relation.

In a particularly advantageous embodiment, the aforesaid relation keep to a substantially constant value along the axial development of the belt structure 10 the product of the mass of coils 14a of the cord 14 arranged within a unitary portion of a given value by the square of the distance between the center of said portion and the rotation axis of the tire 1, so that during tire rolling the resulting centrifugal forces in each of said portions have all the same value, causing a uniform stress state from one end to the other of the belt structure 10.

Preferably, the axial density according to which the coils 14a of the cord 14 are distributed is determined by the following relation:

$$Nx = K \frac{R^2}{r^2} No$$

wherein:
No is the number of coils 14a of the cord 14 arranged in a central portion of unitary value, for instance 1 cm, located on either side of the equatorial plane X—X;
R is the distance between the center of said central portion in the radially outer layer of the belt structure 10 and the rotation axis of the tire 1;
r is the distance between the center of one of said unitary portions located in the region comprised between the center and the ends of the radially outer layer of the belt structure 10 and the rotation axis of the tire 1;
K is a parameter that takes into account the constituent material and the formation of cords 14, as well as the amount of rubber around the cord 14 and the weight of the radially inner layer 11 of the belt structure 10 at said unitary portion, which is variable with variations in the material type and in the structural features of the radially inner layer 11 along the crown profile that diverge from the reference values.

This parameter K may take a value substantially close to 1 if the cords 14 have the same formation and all the connected materials are the same throughout the layers, and different values according to variations of materials and formation of the reinforcing elements along the peripheral development of the belt structure 10.

Solely by way of example, a layer including zero-degree cords might be devised comprising textile cords (of aramid) in a central position and metal cords (HE) in the adjacent side portions, and vice-versa.

Clearly, those skilled in the art may find other relations which, according to the aforesaid design variables, would allow to achieve at the same time a differentiated stiffness along the axial direction and a stress uniformity in the belt structure of the running tire, by varying in a controlled and predetermined manner the density of the aforesaid cords 14.

As to the density of the zero-degree cords in the equatorial zone E, where the maximum thinning out takes place, said density, for a tire to be mounted on the front wheel, is preferably not greater than 8 cords/cm and more preferably comprised between 3 cords/cm and 6 cords/cm.

The width of said equatorial zone E is preferably comprised between 10% and 30% of the axial development of the belt structure 10.

Conveniently, for a tire to be mounted on the rear wheel, the quantity of cords 14 in said equatorial zone E is equal to a value comprised between 80% and 100% of the quantity of cords near the shoulder portions F, G of the tire 1, where the density of said cords is preferably not greater than 10 cords/cm and more preferably comprised between 8 cords/cm and 10 cords/cm.

A tread 15, by means of which the tire 1 gets in touch with the ground, is applied in a known manner onto the belt structure 10 described hereinabove.

The tread 15 is subsequently molded with a suitable tread pattern, comprising in a known manner a plurality of blocks, all indicated by 16, defined between a plurality of grooves 17, only some of which are visible in FIG. 1.

Figure 3:
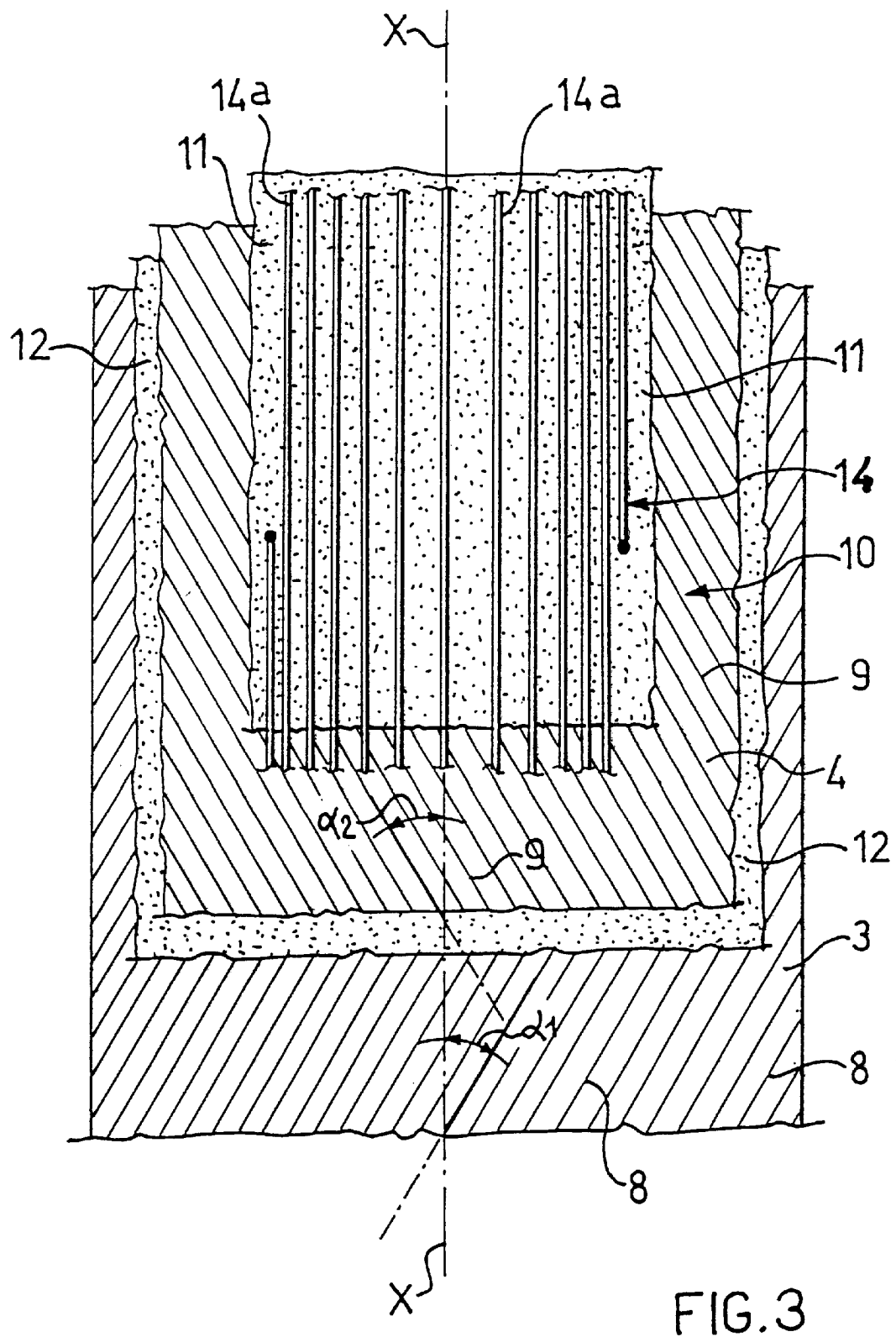
FIG. 3 shows a plan view, schematic and simplified, of some portions of the carcass and belt structures of an alternative embodiment of the tire of the invention.

According to an alternative embodiment, shown in FIG. 3, the tire 1 may further comprise a second sheet 12 made of an elastomeric material interposed between the carcass plies 3 and 4.

In this way, it is possible to absorb the shear stresses which are generated between plies 3, 4 of the carcass structure 2 during rolling of the tire 1.

Also in this case and just in the same way as has been illustrated with reference to the sheet 11, the sheet 12 preferably incorporates homogeneously dispersed reinforcing fibrous fillers made of a material selected from the group comprising textile and metal fibers, fiberglass or short fibrillated aramid fibers.

Conveniently, the sheet 12 incorporates as a reinforcing fibrous filler the so-called aramid pulp (short fibrillated fibers of poly-paraphenylene-terephtalamide), of the type commercially known as "Kevlar®-pulp" or "Twaron®-pulp", or equivalent binding means, suitable to increase the properties of mechanical strength and stretcheability of the elastomeric material in the green state, without substantially altering the adhesion properties thereof.

In fact, it was found that in the presence of aramid fibers dispersed in the composition of the elastomeric material that makes it up, the sheet 12 may take the form of an extremely thin sheet, for instance of a thickness of 0.075 mm to 0.5 mm, without undergoing any laceration as a consequence of the permanent sets caused in the same during the manufacturing steps of the tire.

Also in this case, it was found that the best results are achieved by incorporating aramid pulp in the composition of the green elastomer in an amount comprised between 1 phr and 10 phr (parts by weight per 100 parts of rubber) and using fibers of a length comprised between 0.1 mm and 2.5 mm.

In order to evaluate the quality improvements achieved by the tires of the invention, a set of tests was carried out to compare the tires of the invention with tires of known type for the same use and having a different structure.

More particularly, the tires of the invention described hereinabove were mounted on the front and rear wheels of a motor-cycle of the so-called "touring" type, so as to compare them with the following couples of tires of known type:

1) a first couple of tires Model Metzeler ME1 (type A) provided with a cross-plies carcass and with a belt structure constituted by couples of rubberized fabric strips having cords placed at an angle with respect to the equatorial plane of the tire on both the front and the rear wheel;

2) a second couple of tires (type B) comprising:
   2a) a rear tire Model Metzeler MEZ2 provided with a radial carcass and with a belt structure comprising a winding of zero-degree cords;
   2b) a front tire Model Metzeler MEZ2 provided with a radial carcass and with a belt structure constituted by couples of strips of rubberized fabric having cords placed at an angle with respect to the equatorial plane of the tire.

The characteristics of the motor-bike used in the tests were the following:

| | |
|---|---|
| model | BMW TOURING |
| front tire | |
| size | 120/70-B17 58 V |
| inflation pressure | 2.5 bar |
| rim | 3.50" |
| rear tire | |
| size | 160/70-B17 79 V |
| inflation pressure | 2.9 bar |
| rim | 4.50" |

The tests were directed to evaluate the quality level of the main parameters of driving behavior especially those dependent on the constitution of the carcass structure/belt structure assembly, assigning a mark comprised between 0 and 10 to each parameter considered.

Table I hereinbelow shows the results of the tests.

TABLE I

| Parameter | Type A | Type B | Invention |
|---|---|---|---|
| Shimmy | 5 | 6 | 8 |
| Handling | 7 | 6 | 8 |
| Directional stability | 5 | 6 | 8 |
| Curve roadholding | 6 | 5 | 8 |
| Comfort | 5 | 7 | 8 |
| Wear uniformity | 6 | 7 | 7 |
| Kilometric yield | 5 | 7 | 7 |

By examining the results of the above table it appears immediately evident the improvement achieved by the tires according to the invention as compared with those of the prior art.

Besides, it must be pointed out that such improved results have been achieved together with a weight reduction with respect to the tires designed for use on the test motor-bike, weight reduction which may be estimated to be about 0.2 kg for the front tire and about 0.5 kg for the rear tire, to the advantage of an inertia reduction due to the nonsuspended masses and, consequently, of the vehicle handling.

Obviously, those skilled in the art may introduce modifications and variants to the above described invention in order to satisfy specific and contingent application requirements, which modification and variants fall anyhow within the scope of protection as is defined by the appended claims.

What is claimed is:

1. A high transverse-curvature tire for two-wheeled vehicles, comprising:

a carcass structure including at least two superimposed plies provided with reinforcing cords;

a belt structure coaxially extending around the carcass structure, including a radially-outer layer and a radially-inner layer; and a tread coaxially extending around the belt structure;

wherein the reinforcing cords of each ply of the at least two superimposed plies are essentially parallel to other reinforcing cords of that ply and are oriented along directions inclined with respect to an equatorial plane of the tire, wherein the reinforcing cords of at least two adjacent superimposed plies are oriented in opposite directions with respect to the equatorial plane of the tire, wherein the carcass structure further comprises at least one first sheet, located between the at least two superimposed plies, made of a first elastomeric material incorporating fibrous reinforcing fillers suitable to increase stretchability properties of the at least one first sheet without substantially altering adhesion properties of the at least one first sheet, wherein the radially-outer layer includes a plurality of circumferential coils, axially arranged side-by-side, of at least one inextensible cord circumferentially wound at a substantially-null angle with respect to the equatorial plane of the tire, wherein the plurality of circumferential coils are distributed with a constant density throughout an axial development of the belt structure, and wherein the radially-inner layer comprises at least one second sheet made of a second elastomeric material incorporating fibrous reinforcing fillers suitable to increase stretchability properties of the at least one second sheet without substantially altering adhesion properties of the at least one second sheet.

2. The tire of claim 1, wherein the density of the plurality of circumferential coils is not greater than 10 cords/cm.

3. The tire of claim 1, wherein the density of the plurality of circumferential coils is between 8 cords/cm and 10 cords/cm.

4. The tire of claim 1, wherein the reinforcing cords of each ply of the at least two superimposed plies form a crown angle between 25° and 70° with respect to the equatorial plane of the tire.

5. The tire of claim 1, wherein the reinforcing cords of a first of the at least two superimposed plies are made of a different material than the reinforcing cords of a second of the at least two superimposed plies.

6. The tire of claim 1, wherein the fibrous reinforcing fillers suitable to increase stretchability properties of the at least one first sheet are one or more of textile fibers, metal fibers, fiberglass, and aramid pulp.

7. The tire of claim 1, wherein the fibrous reinforcing fillers suitable to increase stretchability properties of the at least one first sheet are aramid pulp.

8. The tire of claim 1, wherein the fibrous reinforcing fillers suitable to increase stretchability properties of the at least one second sheet are one or more of textile fibers, metal fibers, fiberglass, and aramid pulp.

9. The tire of claim 1, wherein the fibrous reinforcing fillers suitable to increase stretchability properties of the at least one second sheet are aramid pulp.

10. The tire of claim 1, wherein the fibrous reinforcing fillers suitable to increase stretchability properties of the at least one first sheet are one or more of textile fibers, metal fibers, fiberglass, and aramid pulp, and wherein the fibrous reinforcing fillers suitable to increase stretchability properties of the at least one second sheet are one or more of textile fibers, metal fibers, fiberglass, and aramid pulp.

11. The tire of claim 1, wherein the fibrous reinforcing fillers suitable to increase stretchability properties of the at least one first sheet are aramid pulp, and wherein the fibrous reinforcing fillers suitable to increase stretchability properties of the at least one second sheet are aramid pulp.

* * * * *